United States Patent [19]

Becker

[11] 4,290,933

[45] Sep. 22, 1981

[54] ADHESIVE COMPOSITION FOR MAKING FORM SETS FROM CARBONLESS COPY PAPER SHEETS

[75] Inventor: William J. Becker, Appleton, Wis.

[73] Assignee: Appleton Papers Inc., Appleton, Wis.

[21] Appl. No.: 139,116

[22] Filed: Apr. 10, 1980

Related U.S. Application Data

[63] Continuation of Ser. No. 928,143, Jul. 26, 1978, abandoned.

[51] Int. Cl.³ ................................................. C08K 3/38
[52] U.S. Cl. ............................. 260/29.6 MM; 156/305
[58] Field of Search ................. 260/29.6 M, 29.6 MM, 260/29.7 R

[56] References Cited

U.S. PATENT DOCUMENTS

| | | | |
|---|---|---|---|
| 2,809,949 | 10/1957 | Orth | 260/29.6 MM |
| 3,154,510 | 10/1964 | Bryan | 260/29.6 M |
| 3,945,962 | 3/1976 | Clark | 260/29.6 MM |
| 4,009,311 | 2/1977 | Schoenberg | 428/182 |

FOREIGN PATENT DOCUMENTS 1263510  2/1972  United Kingdom .

*Primary Examiner*—Paul R. Michl
*Attorney, Agent, or Firm*—Birch, Stewart, Kolasch & Birch

[57] ABSTRACT

A process for separating a collated stack of carbonless copy paper sheets into form sets, which comprises applying to the edge of the stack of sheets to be padded an adhesive composition containing borax, drying and separating the unit sets.

5 Claims, No Drawings

ADHESIVE COMPOSITION FOR MAKING FORM SETS FROM CARBONLESS COPY PAPER SHEETS

This application is a continuation of copending application Ser. No. 928,143, filed on July 26, 1978, now abandoned.

BACKGROUND OF THE INVENTION

1. Field of the Invention

The present invention pertains to an adhesive composition for producing a series of unit set multi-ply carbonless copy paper forms from a stack (lift) of collated sheets. More specifically, the invention relates to a novel adhesive composition which is applied (padded) to the edge of the lift. The edge is then dried, and the lift is separated into individual multi-ply carbonless paper forms.

2. Description of the Prior Art

For many years carbonless copy paper has been made into form sets from a lift of collated sheets by applying an adhesive to one edge of the lift, drying the padded edge and fanning the lift into individual form sets. British Pat. No. 1,263,510 discloses an improvement in edge-padding performance by using as the adhesive a mixture of an aqueous solution of a gelatin derivative and an aqueous emulsion of a polymer. Further improvements in edge-padding are taught in U.S. Pat. Nos. 3,960,638; 3,963,553; 3,970,500; 3,970,501; and 4,041,193 where a naphthalene sulfonic acid-formaldehyde condensate is used in an edge-padding adhesive formulation in various combinations with materials such as water-soluble polymers, water-soluble binders, water-soluble metal salts, polymer emulsions, surface active agents and latexes. Japanese Patent Publication Nos. 12844/1978 and 12845/1978 teach the use of a surface active agent with an aqueous solution of a synthetic polymer adhesive or an aqueous emulsion of a synthetic polymeric adhesive, respectively, in an edge-padding adhesive formulation. Japanese Patent Disclosure No. 99635/1974 teaches an aqueous edge-padding adhesive composition comprising a vinyl acetate-maleic acid copolymer and various alcohols.

U.S. Pat. No. 3,963,553 discloses edge-padding adhesive compositions comprising latex emulsions, water-soluble metal salts and organic solvents. However, there is no teaching therein concerning the criticality of the selection of type and amount of the metal salt and the time of addition as these factors relate to coagulation of the latex and hence to inoperability of the system. Also, the organic solvents disclosed do not relate to water miscibility and resulting homogeneity, a requirement for satisfactory performance in a water-based edge-padding adhesive composition.

U.S. Pat. Nos. 3,779,857 and 4,055,694 disclose the use of borax as an extender in latex compositions for use in coating and laminating textiles. There is no teaching or suggestion of the use of such compositions as edge-padding adhesives.

SUMMARY OF THE INVENTION

In accordance with the present invention, it has been found that the addition of borax (sodium tetraborate decahydrate) to an edge-padding adhesive composition improves the edge-padding behavior of carbonless copy paper. Carbonless copy paper either as manufactured or upon aging can possess a wide range of properties which relate to edge-padding performance. The use of the adhesive composition of the present invention results in an improvement in the edge-padding characteristics thereof.

Thus, it is an object of the present invention to provide an adhesive for making form sets simply and correctly from a stack of carbonless copy paper sheets.

Another object of the present invention is to provide a process which when utilized will render a stack of carbonless copy paper sheets capable of being edge-padded successfully with the disclosed novel edge-padding adhesives.

These and other objects and advantages of the present invention will be apparent from the following description.

DETAILED DESCRIPTION OF THE INVENTION

In the present invention "edge-padding" designates the process whereby form sets can be made from a stack of collated carbonless copy paper sheets by applying an adhesive to one edge of the stack, drying the adhesive and fanning the stack into individual form sets. When edge-padding is performed on carbonless copy paper combinations the following types of sheets can be used: sheets produced by coating a microcapsule layer containing a color former on a support (CB or coated back); sheets produced by coating a color-developing layer on a support (CF or coated front); and sheets produced by coating a color-developing layer on one surface and the microcapsule layer on the other surface of a support (CFB or coated front and back).

The collated stack of carbonless copy paper sheets can be assembled in the sequence, for example, CB-CF, CB-CF, CB-CF, . . . , CB-CF, or CB-CFB-CFB- . . . -CF, CB-CFB-CFB- . . . -CF, . . . , CB-CFB-CFB- . . . -CF. When an adhesive composition is applied to one edge of the stack, dried and the dried stack is fanned, the sheets are selectively adhered and the stack separated into complete unit set forms. The unit forms take the configuration as described above, i.e., either CB-CF or CB-CFB-CFB- . . . -CF. Selective adherence occurs because the adhesive bonds the coated surfaces of the collated forms, but not the uncoated surfaces. When the dried stack is fanned, separation occurs between the uncoated surfaces. Thus, by this process a stack of carbonless copy papers is easily converted to a series of unit set forms which are then ready for use.

The above process is performed quite easily and simply with most carbonless copy paper. However, occasionally some carbonless copy paper sheets within the collated stack, as made or upon aging, will not respond satisfactorily to such an edge-padding treatment when prior art adhesives are used in a single step process. Bonding between sheets will sometimes occur between uncoated surfaces. This phenomenon is called blocking. Occasionally, the bonding between coated surfaces will be insufficient and bonding between uncoated surfaces will occur to such a degree that during fanning the sheets will separate at the coated interfaces. This phenomenon is called reverse padding in the case of two-part forms. Also, proper non-bonding between uncoated surfaces will sometimes be accompanied by weak bonding between some of the coated surfaces. In this case during fanning the stack separates, in part, into individual sheets. This situation is called fall-apart. Utilization of the adhesive composition of the present invention makes it possible to overcome all of these problems.

The pressure-sensitive or carbonless copy paper systems to be edge-padded with the adhesive of the present invention can be any of the coated systems well known in the art. Pressure-sensitive mark-forming systems generally comprise sheet support material having unreacted mark-forming components disposed thereon and a liquid solvent in which one or both of the mark-forming components is soluble, said liquid solvent being present in such form that it is maintained in an isolated manner by a pressure-rupturable barrier from at least one of the mark-forming components until the application of pressure causes a breach of the barrier in the area delineated by the pressure pattern. The mark-forming components are thereby brought into reactive contact, producing a distinctive mark.

The pressure-rupturable barrier, which maintains the mark-forming components in isolation, preferably comprises a microencapsulated liquid solvent solution. The microencapsulation process utilized can be chosen from the many known in the art. Well known methods are disclosed in U.S. Pat. Nos. 2,800,457; 3,041,289; 3,533,958; 3,755,190; and 4,001,140. Any of these and other methods are suitable for encapsulating the chromogenic compounds used to coat paper edge-padding in accordance with this invention.

The method of marking comprises providing a chromogenic compound and bringing such chromogenic compound into reactive contact, in areas where marking is desired, with an acidic color-developing substance to produce a dark-colored form of the chromogenic compound.

The acidic color-developing materials can be any compound within the definition of a Lewis acid, i.e., an electron acceptor. These materials include clay substances such as attapulgite, bentonite and montmorillonite and treated clays such as silton clay as disclosed in U.S. Pat. Nos. 3,622,364 and 3,753,761, materials such as silica gel, talc, feldspar, magnesium trisilicate, pyrophyllite, ainc sulfate, zinc sulfide, calcium sulfate, calcium citrate, calcium phosphate, calcium fluoride and barium sulfate, aromatic carboxylic acids such as salicylic acid, derivatives of aromatic carboxylic acids and metal salts thereof as disclosed in U.S. Pat. No. 4,022,936 and acidic polymeric materials such as phenol-formaldehyde polymers, phenol-acetylene polymers, maleic acid-rosin resins, partially or wholly hydrolyzed styrene-maleic anhydride copolymers and ethylene-maleic anhydride copolymers, carboxy polymethylene and wholly or partially hydrolyzed vinyl methyl ether maleic anhydride copolymers and mixtures thereof as disclosed in U.S. Pat. No. 3,672,935.

Particularly useful as acid color-activating substances are the metal-modified phenolic resins. U.S. Pat. No. 3,732,120 discloses record sheet material coated with resins of this type. An example of a composition which can be coated onto the surface of a sheet for reaction with a chromogenic compound is as follows:

| Coating Composition | Percent by Weight |
|---|---|
| Zinc-modified phenolic polymer | 13.6 |
| Paper coating kaolin | 67.9 |
| Calcium carbonate | 6.0 |
| Styrene-butadiene latex | 6.0 |
| Etherified corn starch | 6.5 |

The adhesive compositions of the present invention are prepared by formulating a prior art latex emulsion edge-padding adhesive and adding just prior to the use thereof a solution of borax (sodium tetraborate decahydrate) in water. The final adhesive composition comprises a latex emulsion, a water-miscible organic solvent, and borax in water.

The borax is used in a concentration sufficient to produce a significantly favorable effect on edge-padding performance but is kept at a low enough concentration so as not to adversely affect the adhesive composition by coagulation or by otherwise changing the properties of the latex. The final adhesive composition contains about 1.0 to 1.5% by weight, preferably 1.1 to 1.3% by weight, of the borax, about 8 to 17% by weight, preferably 10 to 13% by weight, of the latex and about 20 to 35% by weight, preferably 25 to 30% by weight, of the water-miscible organic solvents. A water solution of the borax is added to the composition just prior to its use as an edge-padding adhesive.

In the practice of the present invention, a stack of collated carbonless copy paper sheets is jogged to the edge to be edge-padded. A conventional edge-padding latex emulsion adhesive, e.g., an acrylic latex adhesive formulation, is mixed with a water solution of borax. The adhesive is applied to the desired edge with a brush, the adhesive is dried and the stack is fanned into individual unit set forms.

As a comparative test and as a non-limitative illustrative example of the invention, a prior art edge-padding adhesive and an adhesive according to the present invention having the following compositions were prepared in water (the percentages being weight percent):

| | Prior Art Adhesive |
|---|---|
| 10.6% | Acrylic latex solids |
| 20% | ethylene glycol monomethyl ether |
| 8% | denatured alcohol (denatured with 5 gallons of commercial methanol per 100 gallons of 95% ethanol, known as "Formula 3A") |
| | Adhesive of the Present Invention |
| 10.6% | Acrylic latex solids |
| 20% | ethylene glycol monomethyl ether |
| 8% | denatured alcohol (as defined above) |
| 1.25% | borax |

Using the foregoing procedure, five form sets were edge-padded using the prior art adhesive and the adhesive of the present invention, respectively. The repeating units of the collated sheets of the form sets are defined in the following table according to basis weight of a 1300 ft² ream of the paper.

| | Edge-Padding Results | |
|---|---|---|
| Form Sets | Prior Art Adhesive | Adhesive of the Present Invention |
| 15 lb CB | Blocking. | Successful. |
| 17 lb. CFB | | |
| 17 lb. CFB | | |
| 15 lb. CF | | |
| 30 lb. CB | Blocking. Reverse Padding. | Successful. |
| 17 lb. CFB | CB-CFB very weak bond. | |
| 15 lb. CF | | |
| 15 lb. CB | CB-CFB bond fall-apart. | Successful. |
| 17 lb. CFB | | |
| 15 lb. CF | | |
| 15 lb. CB | CFB(II)-CF bond very | Successful. |
| 17 lb. CFB(I) | weak | |
| 17 lb. CFB(II) | | |
| 15 lb. CF | | |

-continued

| | Edge-Padding Results | |
|---|---|---|
| Form Sets | Prior Art Adhesive | Adhesive of the Present Invention |
| 22 lb. CB 15 lb. CF | Reverse padding. | Successful. |

Successful edge-padding results mean that there is successful bonding between coated sheets, no bonding between uncoated sheets and that the forms separate into individual sets upon fanning.

Thus, it can be seen that utilization of the edge-padding adhesive composition of the present invention results in improved edge-padding performance to the point of complete success.

The invention being thus described, it will be obvious that the same may be varied in many ways. Such variations are not to be regarded as a departure from the spirit and scope of the invention, and all such modifications are intended to be included within the scope of the following claims.

What is claimed is:

1. An adhesive composition for making form sets from carbonless copy paper sheets consisting essentially of:
   (a) an acrylic polymer latex emulsion,
   (b) at least one water-miscible organic solvent, and
   (c) sodium tetraborate decahydrate.

2. The composition of claim 1, wherein the sodium tetraborate decahydrate is present in an amount of about 1.0 to 1.5 percent by weight.

3. The composition of claim 2, wherein the latex is present in an amount of about 8 to 17 percent by weight.

4. The composition of claim 1, wherein the sodium tetraborate decahydrate is present in an amount of 1.1 to 1.3% by weight.

5. The composition of claim 1, wherein the latex is present in an amount of 10 to 13% by weight.

* * * * *